(12) United States Patent
Jadrich et al.

(10) Patent No.: US 7,569,831 B2
(45) Date of Patent: Aug. 4, 2009

(54) ASSEMBLY FEATURES AND SHOCK PROTECTION FOR A DIGITAL RADIOGRAPHY DETECTOR

(75) Inventors: Bradley Stephen Jadrich, Rochester, NY (US); Timothy Peter, Hilton, NY (US)

(73) Assignee: Carestream Health, Inc., Rochester, NY (US)

( * ) Notice: Subject to any disclaimer, the term of this patent is extended or adjusted under 35 U.S.C. 154(b) by 89 days.

(21) Appl. No.: 11/854,006

(22) Filed: Sep. 12, 2007

(65) Prior Publication Data

US 2009/0065703 A1    Mar. 12, 2009

(51) Int. Cl.
G01T 1/20  (2006.01)

(52) U.S. Cl. ................................. 250/370.11

(58) Field of Classification Search ............ 250/370.01, 250/370.02, 370.03, 370.04, 370.05, 370.06, 250/370.07, 370.08, 370.09, 370.1, 370.11, 250/370.12, 370.13, 370.14, 370.15; 378/189, 378/98.8
See application file for complete search history.

(56) References Cited

U.S. PATENT DOCUMENTS

| | | | |
|---|---|---|---|
| 5,804,832 A | 9/1998 | Crowell et al. | 250/580 |
| 5,844,961 A | 12/1998 | McEvoy et al. | 378/98.8 |
| 6,700,126 B2 | 3/2004 | Watanabe | 250/370.09 |
| 6,967,333 B2 | 11/2005 | Hata | 250/370.11 |
| 2004/0227096 A1 | 11/2004 | Yagi | |
| 2005/0017188 A1 | 1/2005 | Yagi | |

FOREIGN PATENT DOCUMENTS

JP    2001066721 A  *  3/2001

* cited by examiner

Primary Examiner—David P Porta
Assistant Examiner—Kiho Kim

(57) ABSTRACT

A digital radiography detector includes a casing having a planar member and side walls defining a cavity; a baseplate located within the cavity; and a radiography detector assembly mounted on the baseplate. Means are provided for locating the baseplate on the casing planar member. The means includes protrusion features projecting from one of the baseplate and the casing planar member and complementary recess features on the other of the baseplate and the casing planar member, the protrusion features mating with the recess features. The radiography detector assembly includes a photodetector array mounted on the baseplate and a scintillator screen in contact with the photodetector array, wherein the scintillator screen has one or more edges, and including a clamp mounted on the baseplate for clamping the scintillator screen on the one or more edges to the photodetector array to prevent movement of the screen.

17 Claims, 5 Drawing Sheets

ASSEMBLY FEATURES AND SHOCK PROTECTION FOR A DIGITAL RADIOGRAPHY DETECTOR

CROSS-REFERENCE TO RELATED APPLICATIONS

This application claims the benefit under 35 USC 120 of the filing date of U.S. patent application Ser. No. 11/441,584, filed May 5, 2006, entitled "Compact and Durable Encasement For A Digital Radiography Detector", inventors Jadrich et al.

FIELD OF THE INVENTION

The invention relates generally to the field of medical imaging systems, and in particular to digital radiography detectors. More specifically, the invention relates to assembly features and shock protection for a digital radiography detector.

BACKGROUND OF THE INVENTION

Traditional film-screen radiography has been used as a medical imaging diagnostic system for well over a century. X-rays are projected through a patient's body part to form a latent radiographic image on film contained in a cassette. The film must then be chemically or thermally processed to produce a visual radiographic image which can be used by a health care professional for diagnostic purposes. The delay in obtaining a diagnostic image, the use of a chemical or thermal processor, and the difficulty in providing the radiographic film outside of the immediate medical facility, has resulted in the development of digital radiographic imaging systems. Computed radiography (CR) digital systems have been developed in recent years that provide reusable CR plates which are scanned to produce a digital radiographic image. The CR systems still result in a delay in obtaining a diagnostic image due to the necessity of scanning an exposed CR plate.

Digital radiography is achieving a growing acceptance as an alternative to film-screen and CR radiography systems. With digital radiography (DR), the radiation image exposures captured on radiation sensitive layers are converted, pixel by pixel, to digital image data which is stored and subsequently displayed on electronic display devices. This enables virtually instant access to the radiographic image and the ability to communicate a radiographic image via networks to a remote location for analysis and diagnosis by radiologists without delay in sending chemically or thermally process radiographic films by courier or through the mail. The use of chemical or thermal processors is also eliminated by digital radiography systems.

The dimensions of medical radiographic cassettes/screens/films are specified under industry standards. This includes both conventional film and CR phosphor screens, with nominal imaging areas, such as 35 cm×43 cm and 40 cm×40 cm. Standard cassette dimensions are also specified by industry standards, including a maximum cassette thickness, such as 16 mm. To be used in the same radiographic environment, it is desirable that the DR detectors meet these same industry standard dimensional requirements.

U.S. Pat. No. 5,804,832, issued Sep. 8, 1998, inventors Crowell et al., discloses a digital array for capturing a radiograph where a rigid support for the detection panel is mounted directly to a plurality of shock absorbing mounts. This requires additional parts and assembly steps to build the detector.

U.S. Pat. No. 6,700,126 B2, issued Mar. 2, 2004, inventor Watanabe, discloses a radiographic apparatus where a support for the radiation detector is rigidly fixed onto a casing. Shock absorbers are placed on the side wall(s) of the cassette.

U.S. Pat. No. 6,967,333 B2, issued Nov. 22, 2005, inventor Hata, discloses a two dimensional image pick up where shock absorber means comprise at least a first container and a second container. The containers are filed with gel, air, or other gas, to provide an "airbag" style of shock absorption between the apparatus cabinet and photoelectric converter. Shock absorption using this approach would be ineffective when the space between the apparatus and photoelectric converter is very small.

U.S. Pat. No. 5,844,961, issued Dec. 1, 1998, inventors McEvoy et al., discloses a filmless digital x-ray system that uses a standard x-ray cassette housing. An external power source provides the power for the detector and associated electronic system.

U.S. Patent Application Pub. No. 2004/0227096 A1, published Nov. 18, 2004, inventor Yagi, discloses a metal spring assembly for providing shock isolation to a radiation detector that provides limited shock isolation due to the stiffness of the metal spring type spring.

U.S. Patent Appln. Pub. No. 2005/0017188 A1, published Jan. 27, 2005, inventor Yagi, discloses means to provide shock isolation to a radiation detector, in which shock absorption material is provided between inner and outer frames. This structure increases the size of the cassette.

While such systems may have achieved certain degrees of success in their particular applications, there is a need to provide a digital radiography detector that is easy to assemble and service, while providing an auxiliary means of shock protection to internal detector components. There is also a need to prevent movement and potential damage to detector components under accidental drop-shock conditions. There is a further need to provide means of sealing the exterior of the detector from ingress of fluids so that detector components cannot be damaged.

SUMMARY OF THE INVENTION

An object of the present invention is to provide a digital radiography detector that is easy to assemble and service while providing an auxiliary means of shock protection to internal detector components.

Another object of the present invention is to prevent movement and potential damage to digital radiography detector components under accidental drop-shock conditions.

A further object of the present invention is to provide means of sealing the exterior of a digital radiography detector from ingress of fluids so that detector components cannot be damaged.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a digital radiography detector comprising:

a casing having a planar member and side walls defining a cavity;

a baseplate located within the cavity;

a radiography detector assembly mounted on the baseplate; and means for locating the baseplate on the casing planar member, the means including protrusion features projecting from one of the baseplate and the casing planar member and complementary recess features on the other of the baseplate and the casing planar member, the protrusion features mating with the recess features.

According to another aspect of the invention the radiography detector assembly includes a photodetector array mounted on the baseplate and a scintillator screen in contact with the photodetector array, wherein the scintillator screen has one or more edges, and including a clamp mounted on the baseplate for clamping the scintillator screen on the one or more edges to the photodetector array to prevent movement of the screen.

According to a still further aspect of the invention, the detector includes a cover fastened to the casing spaced from the detector assembly; and including an external shock absorber which is attached to the outside surface of the detector and which encapsulates and seals any fasteners or openings required on the detector casing and cover.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
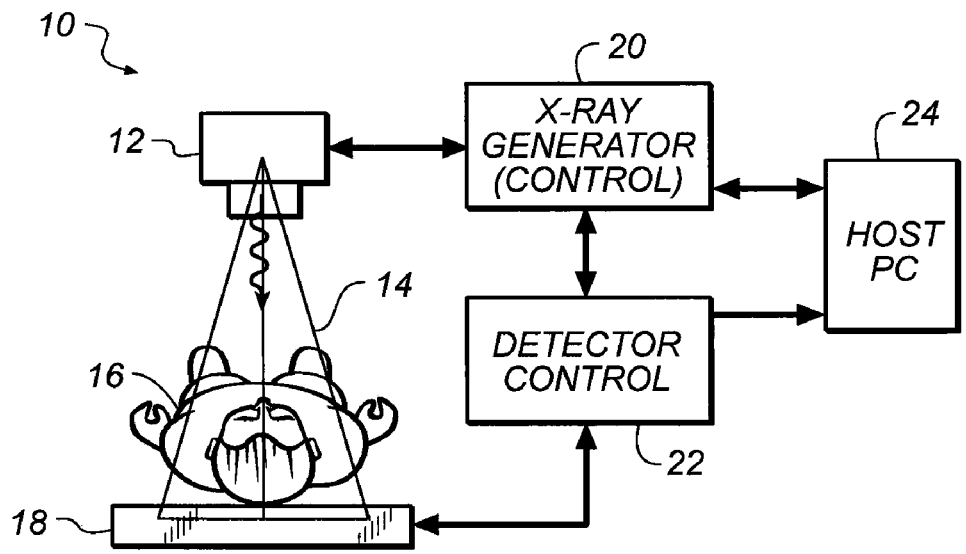
FIG. 1 is a schematic, diagrammatic view showing a digital radiography (DR) system incorporating the present invention.

The following is a detailed description of the preferred embodiments of the invention, reference being made to the drawings in which the same reference numerals identify the same elements of structure in each of the several figures where appropriate.

In general, the present invention relates to digital radiography detectors. Reference is made to U.S. patent application Ser. No. 11/441,584, (the contents of which are hereby incorporated by reference) for additional background information relating to detector structure and primary shock isolation means for use in the present invention. Known DR detector assemblies typically include a two dimensional detector array mounted to a rigid mounting plate, where the mounting plate is rigidly attached to the housing structure. The primary disadvantage of such assemblies is that attachment between the housing and mounting plate requires a plurality of fasteners and substantial assembly time. According to an aspect of the present invention, a DR detector is provided which eliminates the need for directly attaching the mounting plate (hereinafter called baseplate in this application) to a housing (hereinafter called casing in this application). Elimination of the fasteners and attachment features is therefore desirable from an ease of assembly and service perspective, as well as from a minimization of cost perspective.

Referring now to FIG. 1 there is shown a digital radiography system in which the present invention can be used. As shown, system 10 includes an X-ray tube 12 which projects a beam 14 of x-radiation through a body part of patient 16 onto DR detector 18 which captures a digital radiographic image of the irradiated body part. X-ray generator and control 20 controls x-ray tube 12, detector control 22 controls DR detector 18, and host PC 24 controls 20 and 22 and receives digital radiographic images from detector 18.

Figure 2A:
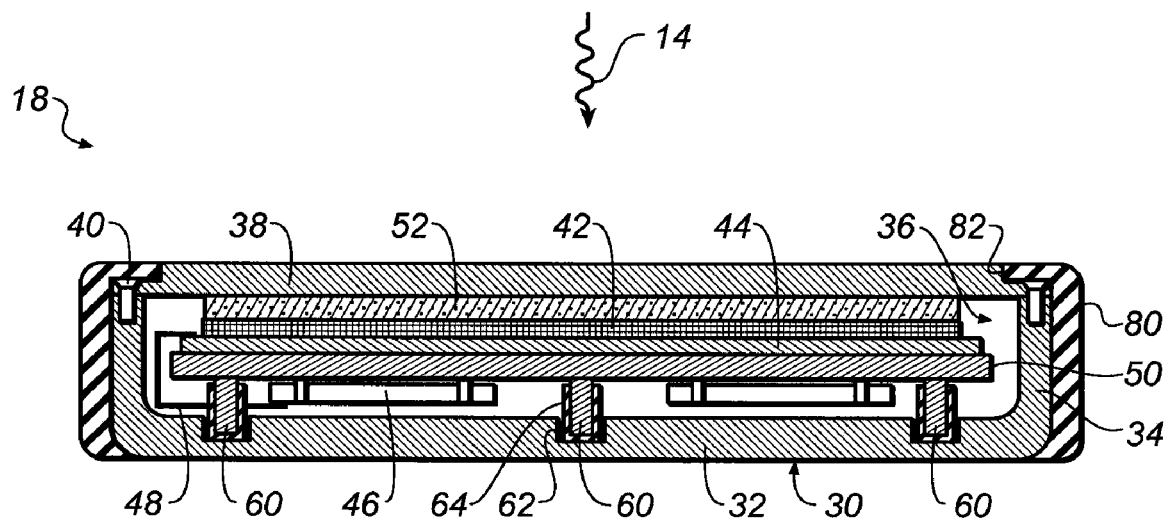
FIG. 2A is a diagrammatic, elevational view of a DR detector showing an embodiment of the present invention.

Referring now to FIG. 2A there is shown an embodiment of the present invention. As shown, DR detector 18 includes casing 30 having a planar member 32 and side walls 34 extending perpendicularly from member 32 to form a cavity 36. A top cover 38 is fastened to casing 30 by fasteners 40. Located within cavity 36 of detector 18 is a radiography detector assembly including a scintillator screen 42, which converts an x-radiation image into a visible light radiographic image, and photodetector array 44 in contact with scintillator screen 42. Photodetector array 44 with associated electronics on circuit board 46 converts the visible light radiographic image into a digital radiographic image which is communicated to PC 24 (FIG. 1) for processing, presentation on a display, transmission to a remote location, and/or storage. Flex circuits 48 connect circuit board(s) 46 and photodetector array 44. Scintillator screen 42 and photodetector array 44 are mounted on a baseplate 50.

Figure 3:
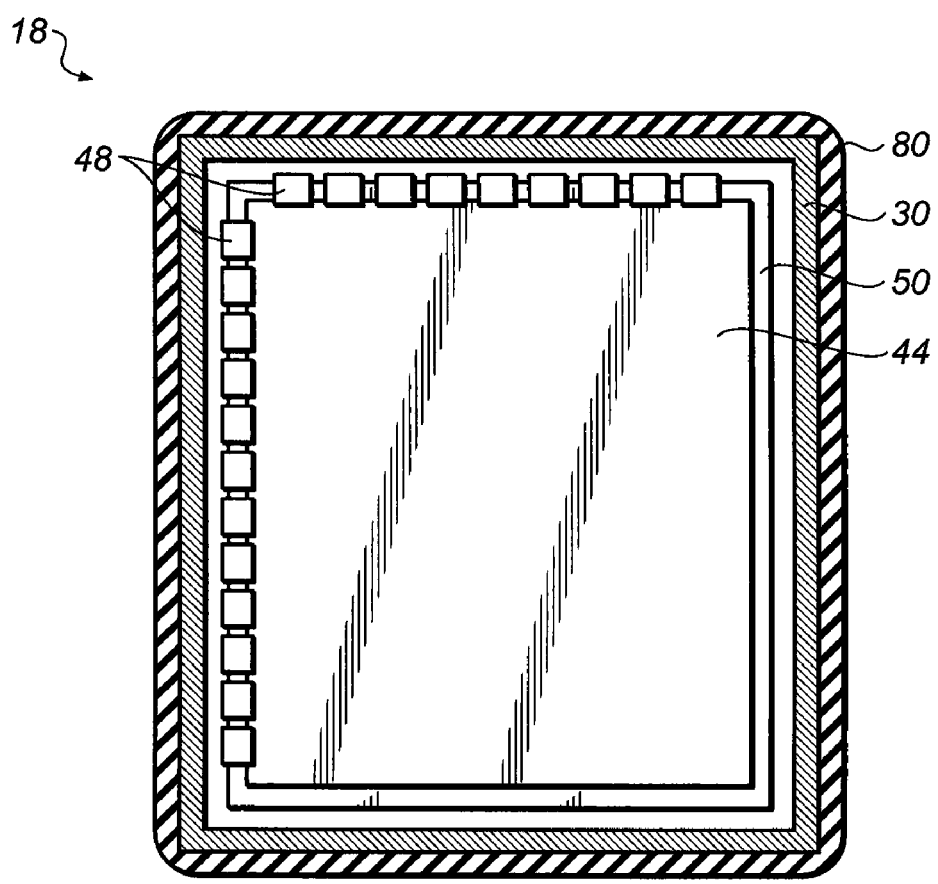
FIG. 3 is a diagrammatic, top plan view showing the embodiment of FIG. 2A.

Photodetector array 44 is mounted on baseplate 50 by adhesive or the like. Scintillator screen 42 can be separate from photodetector array 44 or physically adhered to array 44. In either case, it is important that physical contact be maintained across the entire active area of the detector array so that uniform and efficient transfer of the converted visible light is achieved. Where screen 42 is separate from array 44, compliant foam member 52 accomplishes this. Compliant foam member 52 also provides protection of the detector components from damage due to physical shock or loads applied externally to the detector. FIG. 3 shows flex circuits 48 disposed along two edges of photodetector array 44. Not shown are a power supply and wireless communication device as described in the aforementioned U.S. patent application Ser. No. 11/441,584.

According to one embodiment of the present invention, ease of assembly of the DR detector is carried out by locating baseplate 50 on casing 30 by providing a plurality of protrusion features 60 on the baseplate 50 which mate with a complementary plurality of recess features 62 on member 32 of casing 30. An elastic member 64 is placed on the protrusion 60 to provide auxiliary shock protection to the fragile electronics and photodetector array 44. A typical elastomer material such as 0.020" (0.50 mm) thick, 40 Shore A durometer silicone with adhesive backing can be used. An alternate option is for the elastic member to be pressed in place onto protrusion 60 without using adhesive. A further advantage of using an elastic material is that tolerance variations can be accommodated by compression of this material, when a plurality of recess and protrusion features is used.

Figure 2B:
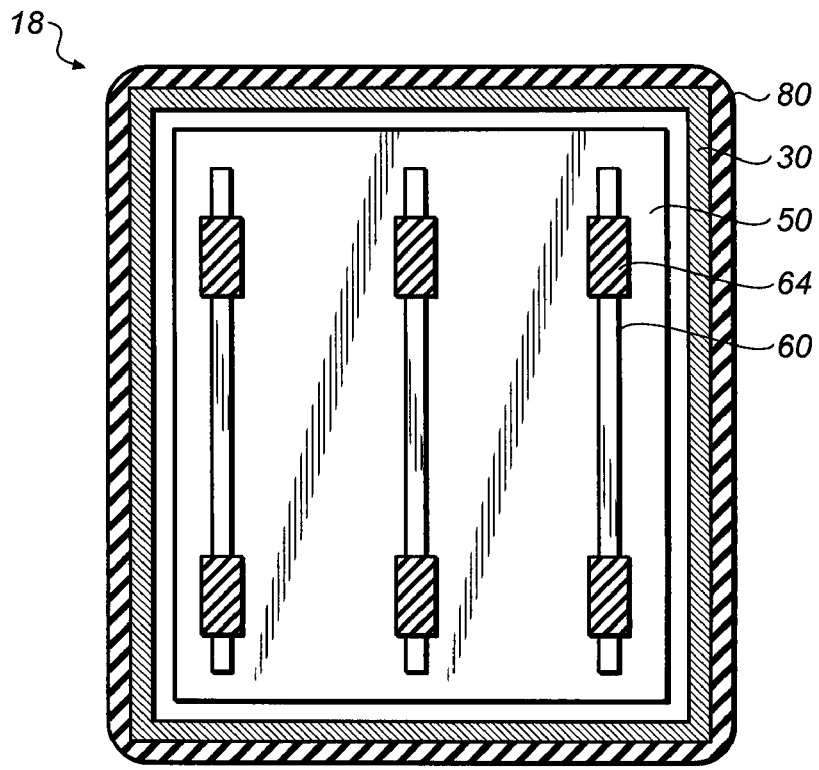
FIGS. 2B and 2C are diagrammatic, bottom plan views showing embodiments of the present invention.
Figure 2C:
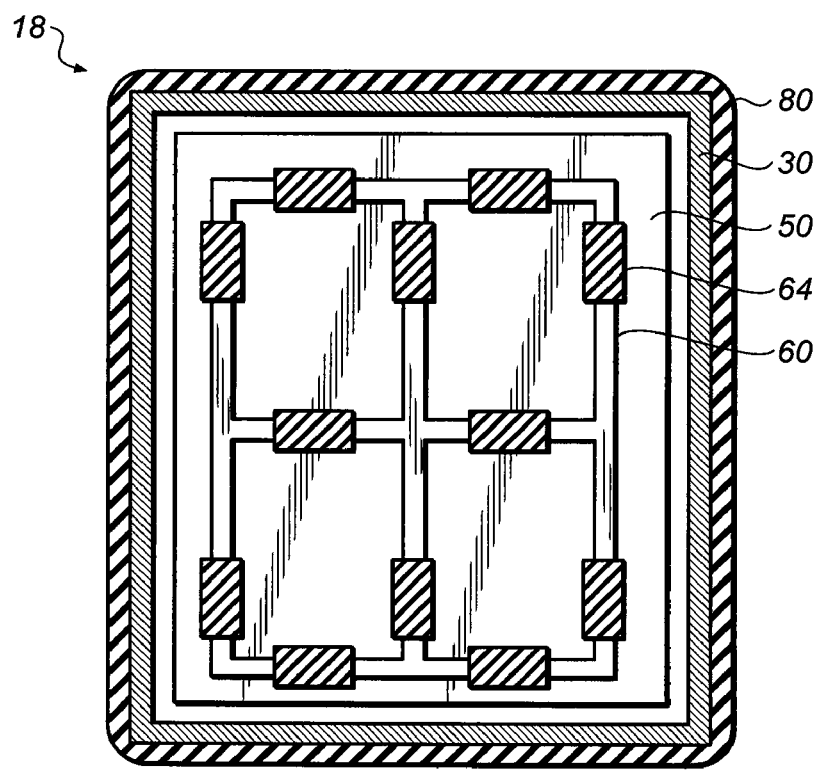

The protrusion and mating recess features 60, 62 can either be in the shape of cylinders, elongated slots, or other appropriate mating features as desired. FIG. 2B shows one embodiment of the invention including a plurality of elongated protrusions 60 and elastic members 64 that are substantially parallel. Casing member 32 would be provided with complementary mating recesses 62. FIG. 2C shows another embodiment of the invention including a plurality of elongated protrusions 60 and elastic members 64 extending in two substantially orthogonal directions. An identical number and pattern of mating recess features 62 in casing member 32 are also provided. This embodiment provides auxiliary shock protection in the two orthogonal directions. Other patterns of protrusion features and mating recess features are also considered to be within the scope of the invention. Such patterns, for example, may be diagonal or curvilinear in nature.

Figure 2D:
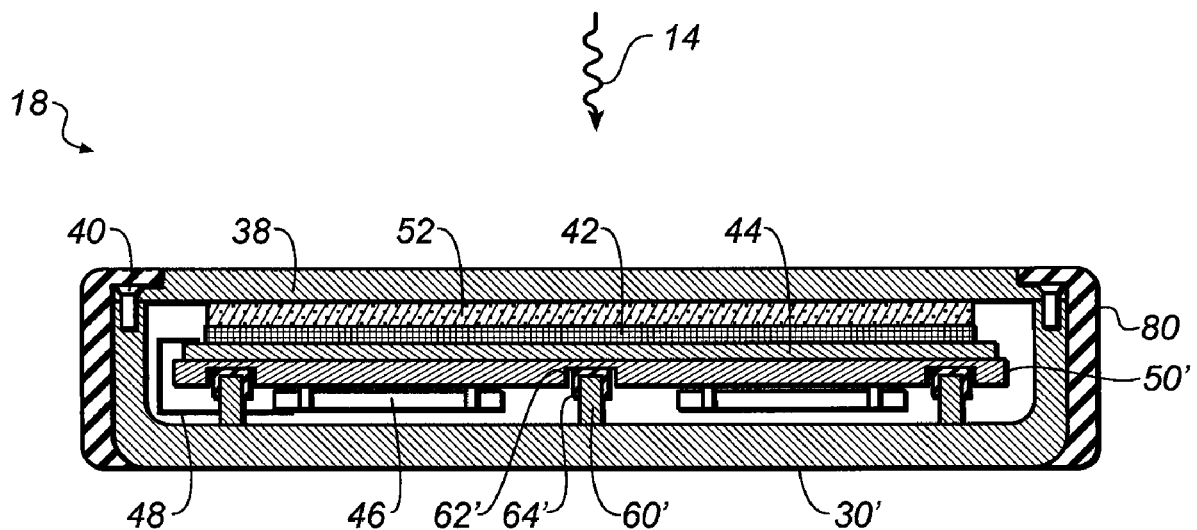
FIG. 2D is a diagrammatic, elevational view of a DR detector showing another embodiment of the present invention.

Further, the invention is not limited to having the protrusions on the baseplate. As an alternative, as shown in FIG. 2D, the protrusion features 60' with elastic members 64' can be mounted on the casing 30', while the mating recess features 62' can be on the baseplate 50'.

Figure 4:
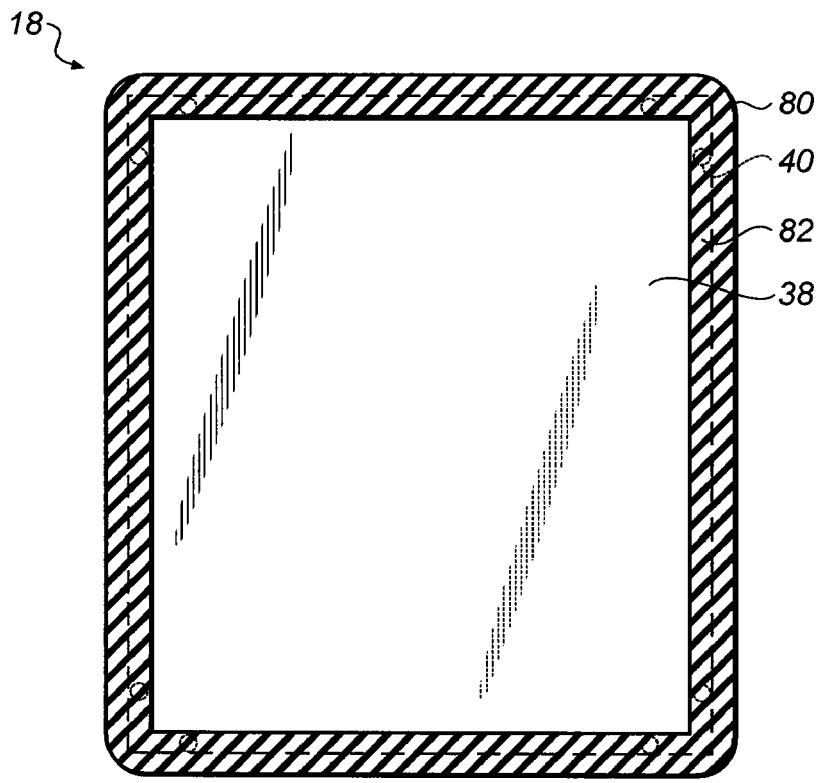
FIG. 4 is a diagrammatic, top plan view showing the shock absorber and top cover interface of an embodiment of the present invention.

According to an embodiment of the present invention, a means of sealing the detector from ingress of fluids is provided. Keeping fluids out of the detector is desirable since there are numerous electronic components mounted internally. Portable imaging is an environment that is most severe for ingress of fluids, where there could be direct patient contact with the detector. FIGS. 2A and 4 show a means where a primary, external shock absorber 80 is attached directly to the outer perimeter of the detector. Primary shock absorption uses an elastomer material that will absorb shock or impact to the detector. As shown in FIG. 4, the profile of shock absorber 80 is extended to encapsulate and seal any fasteners 40 (hidden/buried under shock absorber 80) or openings required on the detector components, as at seal region 82. The exterior edge of casing 30 is hidden. The shock absorber material could be elastic in nature so that it provides sufficient compression to seal against the mating parts. Additionally, an adhesive can be used at the interface between casing 30 and shock absorber 80, if a more permanent seal is desired. Alternatively, the shock absorber 80 can be directly molded around the perimeter of the assembled detector.

In a DR detector where the scintillator screen is not directly coated or bonded to the photodetector, it is desirable to mechanically constrain the screen so that it does not move during a drop shock condition. Because typical screen material for fluorescence applications is both high in density and relatively thick (to 0.5 mm), it has both high mass and momentum during severe drop shock as a result. The compliant foam member used to preload a detached screen against the photodetector array may be insufficient to hold the screen in place and maintain its registration with the photodetector array. Therefore, a means to constrain the screen to eliminate its movement is desired.

Figure 5:
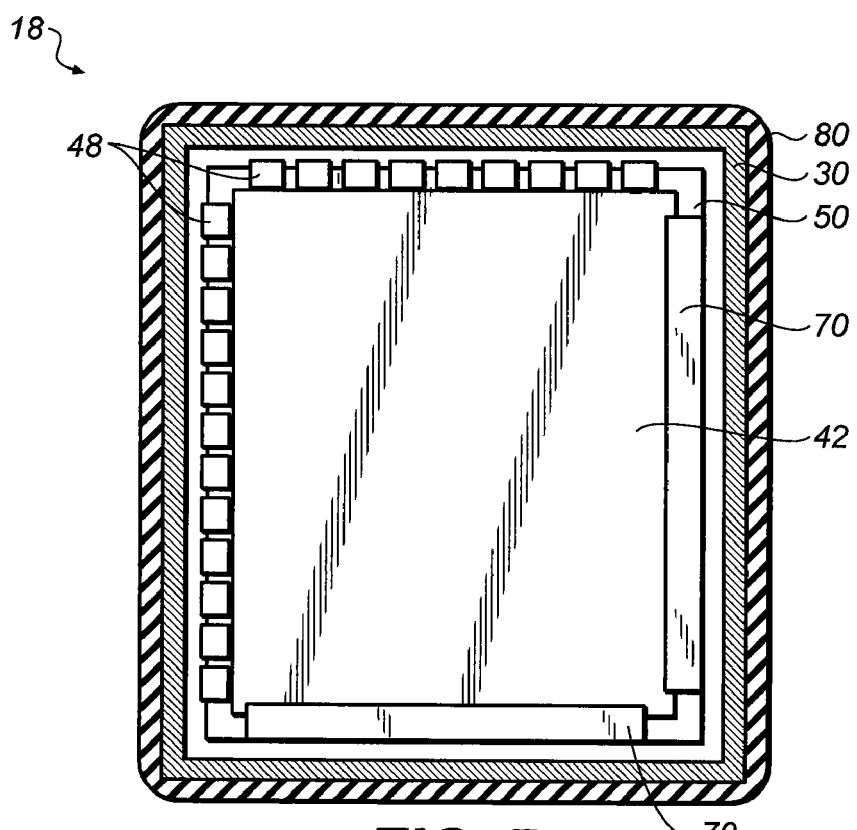
FIGS. 5 and 6 are respective diagrammatic, top plan and partial elevational views showing the screen clamp embodiment of the present invention.
Figure 6:
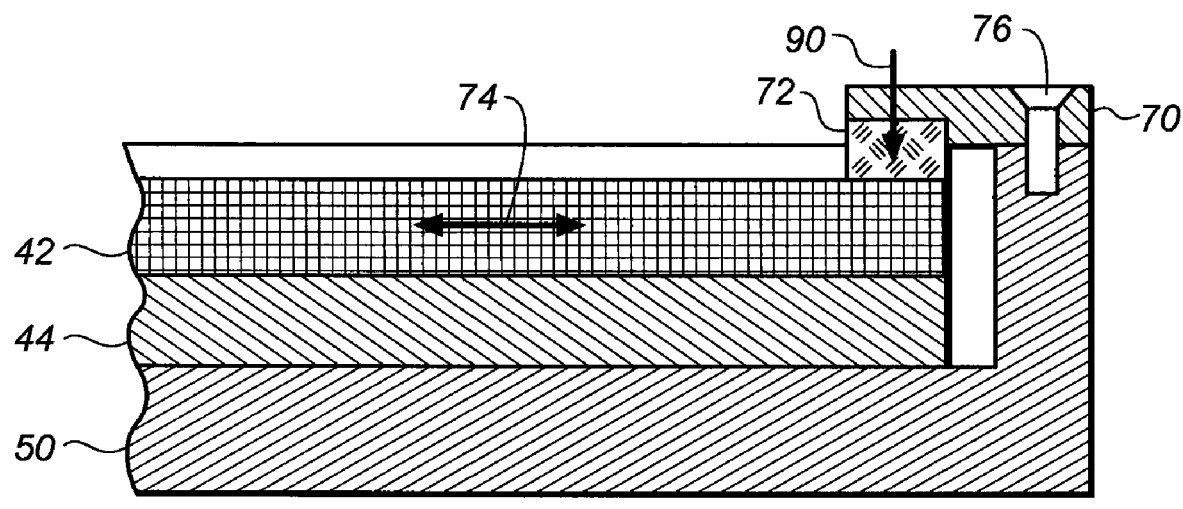

According to another feature of the present invention as shown in FIGS. 5 and 6, a simple clamping device solves this problem. As shown, at least one and preferably two clamps 70 extend the length of one or more of the four scintillator screen 42 edges. Clamps 70 apply a force against screen 42 in the direction of arrow 90. It is important that the clamping arrangement does not extend into the active image area of the detector assembly to prevent any image or backscatter artifacts in the captured radiographic images. Preferably, the clamps 70 are disposed opposite to edges that have flex circuits 48 A clamp force greater than 200 kg. would be needed to constrain a screen with dimensions of 350 mm×430 mm×0.50 mm thick, during a one meter drop. As shown in FIG. 5, clamps are preferably placed along a plurality of screen edges for more effective clamping strength.

As shown in FIG. 6, the clamp arrangement has a friction pad material 72 adhered to it, which resists movement of the screen 42 laterally in the direction of arrow 74. As with the auxiliary shock absorption means 64, the friction pad can be a thin silicone material, which results in a coefficient of friction of greater than 1.0 against the screen. The clamp 70 can be attached to baseplate 50 by conventional threaded fasteners 76, adhesives, or other fastening means that are low in profile height. The low profile height of the clamp arrangement is required so that overall detector thickness is minimized. This is especially important for portable imaging applications where patient comfort is desirable.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10—digital radiography system
12—x-ray tube
14—beam of x-radiation
16—patient
18—DR detector
20—x-ray generator and control
22—detector control
24—host PC
30, 30'—casing
32—planar member
34—side walls
36—cavity
38—top cover
40—fasteners
42—scintillator screen
44—photodetector array
46—circuit board(s)
48—flex circuit(s)
50, 50'—baseplate
52—compliant foam member
60, 60'—protrusion features
62, 62'—recess features
64, 64'—elastic member
70—clamp(s)
72—friction pad material
74—direction arrow
76—threaded fasteners
80—external shock absorber
82—seal region
90—direction arrow

What is claimed is:

1. A digital radiography detector comprising:
a casing having a planar member and side walls defining a cavity;
a baseplate located within the cavity;
a radiography detector assembly mounted on the baseplate; and
means for locating the baseplate on the casing planar member, the means including protrusion features projecting from one of the baseplate and the casing planar member and complementary recess features on the other of the baseplate and the casing planar member, the protrusion features mating with the recess features.

2. The detector of claim 1 including elastomer members on at least a portion of the protrusion features for providing shock protection to the detector assembly.

3. The detector of claim 1 wherein the protrusion features are on the baseplate and the recess features are on the casing planar member.

4. The detector of claim 1 wherein the protrusion features are on the casing planar member and the recess features are on the baseplate.

5. The detector of claim 1 wherein the protrusion features include a plurality of elongated parallel protrusions and the complementary recess features include a like number of mating recess features.

6. The detector of claim 1 wherein the protrusion features include a plurality of elongated protrusions in two substantially orthogonal directions, and wherein the complementary recess features include a like number of mating recess features.

7. The detector of claim 1 wherein the radiography detector assembly includes a photodetector array mounted on the baseplate and a scintillator screen in contact with the photodetector array, wherein the scintillator screen has one or more edges, and including a clamp mounted on the baseplate for clamping the scintillator screen on the one or more edges to the photodetector array to prevent movement of the screen.

8. The detector of claim 7 wherein the scintillator screen has two orthogonally disposed edges and clamps are mounted on the baseplate for clamping the scintillator screen on the two edges.

9. The detector of claim 7 wherein the scintillator screen is rectangular and has four edges, wherein one or more of the edges have flex circuit(s) which connect with electronic circuits mounted between the base member and the casing, and wherein the one or more clamps are disposed on edges opposite to the edges that have flex circuits.

10. The detector of claim 1 including a cover fastened to the casing spaced from the detector assembly; and including an external shock absorber which is attached to the outside surface of the detector and which encapsulates and seals any fasteners or openings required on the detector casing and cover.

11. The detector of claim 10 wherein the shock absorber is an elastomer material.

12. The detector of claim 10 wherein the shock absorber is attached to the detector by means of adhesive.

13. The detector of claim 10 wherein the shock absorber is directly molded around the perimeter of the assembled detector.

14. A digital radiography detector comprising:
a casing having a planar member and side walls defining a cavity;
a baseplate located within the cavity;
a radiography detector assembly mounted on the baseplate, the radiography detector assembly including a photodetector array mounted on the baseplate and a scintillator screen in contact with the photodetector array, wherein the scintillator screen has one or more edges, and including a clamp mounted on the baseplate for clamping the scintillator screen on the one or more edges to the photodetector array to prevent movement of the screen; and
means for locating the baseplate on the casing planar member, the means including protrusion features projecting from one of the baseplate and the casing planar member and complementary recess features on the other of the baseplate and the casing planar member, the protrusion features mating with the recess features.

15. The detector of claim 14 wherein the scintillator screen has two orthogonally disposed edges and clamps are mounted on the baseplate for clamping the scintillator screen on the two edges.

16. The detector of claim 14 wherein the scintillator screen is rectangular and has four edges, wherein one or more of the edges have flex circuit(s) which connect with electronic circuits mounted between the base member and the casing, and wherein the one or more clamps are disposed on edges opposite to the edges that have flex circuits.

17. A digital radiography detector comprising:
a casing having a planar member and side walls defining a cavity;
a baseplate located within the cavity;
a radiography detector assembly mounted on the baseplate; and
means for locating the baseplate on the casing planar member, the means including protrusion features projecting from one of the baseplate and the casing planar member and complementary recess features on the other of the baseplate and the casing planar member, the protrusion features including elastomer members on at least a portion of the protrusion features, the elastomer members mating with the recess features.

* * * * *